US006308559B1

(12) United States Patent
Davison

(10) Patent No.: US 6,308,559 B1
(45) Date of Patent: Oct. 30, 2001

(54) TWO STAGE MONITORING OF EVAPORATIVE PURGE SYSTEM

(75) Inventor: Lynn Edward Davison, Saline, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/571,064

(22) Filed: May 15, 2000

(51) Int. Cl.[7] .................................................... G01M 15/00

(52) U.S. Cl. ............................................................ 73/118.1

(58) Field of Search .................................... 73/116, 117.2, 73/117.3, 118.1; 123/520; 340/438, 439

(56) References Cited

U.S. PATENT DOCUMENTS

| | | | | |
|---|---|---|---|---|
| Re. 37,250 | * | 7/2001 | Kayanuma | 123/520 |
| 5,143,035 | * | 9/1992 | Kayanuma | 123/520 |
| 5,611,320 | * | 3/1997 | Hara et al. . | |
| 5,614,665 | | 3/1997 | Curran et al. | 73/118.1 |
| 5,651,349 | | 7/1997 | Dykstra et al. | 123/520 |
| 5,873,352 | | 2/1999 | Kidokoro et al. | 123/520 |
| 6,044,314 | * | 3/2000 | Cook et al. | 73/118.1 |
| 6,105,556 | * | 8/2000 | Takaku et al. | 123/520 |
| 6,148,803 | * | 11/2000 | Majima et al. | 73/118.1 |
| 6,196,203 | * | 3/2001 | Grieve et al. | 123/520 |
| 6,257,209 | * | 7/2001 | Hyodo et al. | 123/520 |

* cited by examiner

*Primary Examiner*—Eric S. McCall
(74) *Attorney, Agent, or Firm*—John D. Russell; Allan J. Lippa

(57) ABSTRACT

An evaporative purge system 10 of an internal combustion engine 14 powered motor vehicle is monitored using one or more relatively long time tests in the cruise operating mode of the motor vehicle to screen for emission of vapors which, allegedly, contributes to smog. If emission is detected in the cruise operating mode, a command is generated and stored in memory to subsequently monitor the system in the idle operating mode. The evaporative purge system is subsequently monitored using a relatively short time test in the idle operating mode of the motor vehicle to confirm vapor emission.

11 Claims, 5 Drawing Sheets

TWO STAGE MONITORING OF EVAPORATIVE PURGE SYSTEM

BACKGROUND OF THE INVENTION

1. Field of the Invention

The present invention relates to the monitoring of an evaporative purge system of a motor vehicle having a fuel tank connected to an internal combustion engine for the purpose of determining whether the purging system is emitting hydrocarbon emissions into the atmosphere.

2. Description of Related Art

Evaporative emission control systems are widely used in internal combustion engine powered motor vehicles to reduce evaporated fuel; i.e. fuel vapor emissions, from the fuel tank to the atmosphere which, allegedly, contributes to smog. Evaporative purge systems typically include a vapor management valve to control fuel vapor flow to the engine from a vapor storage canister, vapor flow control valves on the fuel tank, as well as hoses or conduits connecting the components. In the event that one or more of the purge system valve components degrades, an emission of fuel vapors may occur, resulting in reduced engine performance and possible release of vapors into the atmosphere. U.S. Pat. No. 5,614,665 describes various modes that can result in emission of fuel vapor to the atmosphere from the evaporative purge system.

Various techniques are known for monitoring the evaporative purge system to determine its functioning. Monitoring techniques have been used to monitor the evaporative system in either the cruise operating mode or the idle operating mode of the motor vehicle. Aforementioned U.S. Pat. No. 5,614,665 discloses a monitoring method and system that involve sealing the evaporative purge system to build up pressure due to evaporation of fuel vapor and monitoring for a pressure change above a predetermined threshold.

As the monitored system emission size is decreased to further reduce vapor emissions, longer monitoring test times are required. Long test times in a vehicle subject to altitude changes with a sealed evaporative purge system can produce false system fault indications.

SUMMARY OF THE INVENTION

The present invention provides pursuant to one embodiment method and apparatus for monitoring an evaporative purge system of a motor vehicle where the evaporative purge system is monitored using one or more relatively long time tests in the cruise operating mode of the motor vehicle to screen for a system emission. If a system emission is detected in the cruise operating mode of the vehicle, a command is provided by an electronic control unit to subsequently monitor the evaporative purge system when the motor vehicle assumes an idle operating mode. The evaporative purge system then is monitored using a relatively short time test in the idle operating mode of the motor vehicle to confirm whether a system emission exists.

The above objects and advantages of the present invention will become more readily apparent from the following description taken with the following drawings.

BRIEF DESCRIPTION OF THE DRAWINGS

FIG. 2 comprising

FIG. 3 comprising

DETAILED DESCRIPTION OF THE PREFERRED EMBODIMENT

Figure 1:
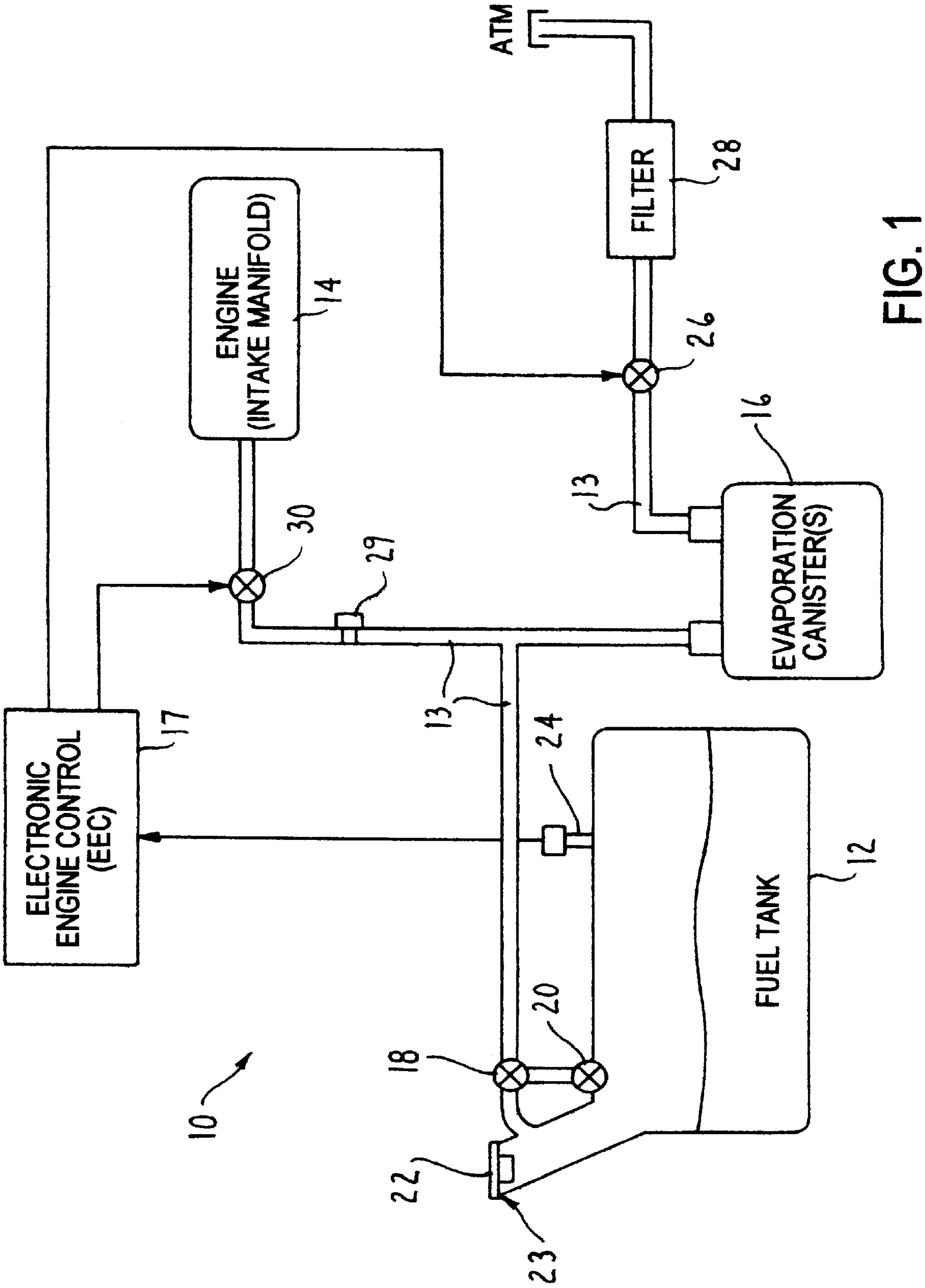
FIG. 1 is a schematic diagram of an evaporative purge system of an internal combustion engine powered vehicle for practicing an embodiment of the invention.

Referring to FIG. 1, an evaporative purge monitoring system 10 is illustrated as including a fuel tank 12, an internal combustion engine 14, and one or more evaporation storage canisters 16 in fluid communication by various conduits or hoses 13 and a conventional electronic engine control unit or module (EEC) 17 of the motor vehicle.

The fuel tank 12 provides fuel to the engine 14 and typically includes a conventional running loss vapor flow control valve 18 and a valve 20. The fuel tank 12 may also include a vacuum relief valve 22 integral with the fuel tank cap 23 for equalizing pressure applied to the fuel tank 12. The fuel tank 12 further includes a pressure transducer 24 for sensing fuel tank pressure or vacuum and for providing an input signal to the EEC 17. The pressure transducer 24 may be installed directly into the fuel tank 12 (as shown) or remotely mounted and communicated by a conduit or hose to the fuel tank 12.

The evaporation canister 16 is provided for trapping, storing and subsequently releasing fuel vapor dispelled from the fuel tank 12 for combustion in the engine as controlled by a conventional purge control valve 30 also known as a vapor management valve. The canister 16 is connected to ambient atmosphere (ATM) through a canister vent valve (CVS) 26. A filter 28 may be provided between the CVS 26 and atmosphere for filtering the air pulled into the canister 16. The CVS 26 comprises a normally open solenoid controlled valve controlled by the EEC 17 via an electrical connection to the CVS 26.

The purge control valve 30 is interposed between the intake manifold (not shown) of the engine 14 and the fuel tank 12 and the canister 16. The purge control valve 30 comprises a normally closed vacuum operated solenoid which is also controlled by the EEC 17. When the valve 30 opens, the vacuum of the intake manifold of the engine 14 establishes a vacuum in the canister 16 and fuel tank 12 and thereby draws fuel vapors from the canister 16 for combustion in the cylinders (not shown) of the engine 14. When the EEC 17 de-energizes the purge control valve 30, fuel vapors are stored in the canister 16.

The evaporative purge system may include a service port 29 interposed between the purge control valve 30 and the fuel tank 12 and canister 16 to aid in conducting diagnostics on the evaporative purge system to identify an emission. An evaporative system tool, such as a pressurization device, may be coupled to the service port 29 in conventional manner so that diagnostic testing can isolate a fault in the system. An evaporative purge system having system components of the type described above is described in U.S. Pat. No. 5,614,665, the teachings of which are incorporated herein by reference.

The invention provides method and apparatus for monitoring the evaporative purge system 10 using one or more relatively long time tests in the cruise operating mode of the motor vehicle to screen for a system emission. If a system emission is detected in the cruise operating mode, a command is generated by EEC 17 to subsequently monitor the evaporative purge system when the motor vehicle assumes the idle operating mode. The evaporative purge system then is monitored using one or more relatively short time tests in the idle operating mode of the motor vehicle to confirm whether a system emission exists. Before the idle operating mode test, the evaporative purge system 10 is subjected to a set-up procedure to provide certain reference conditions of the system, such as a reference fuel tank vacuum level.

In practice of the invention, the cruise operating mode of the motor vehicle includes operation in closed loop fuel control at constant vehicle speed with small variations in throttle position and vehicle direction. The idle operating mode of the motor vehicle encompasses the vehicle in stationary position or below a predetermined vehicle speed (e.g. below 10 mph), with the engine running at idle setting and the throttle closed.

Figure 2A:
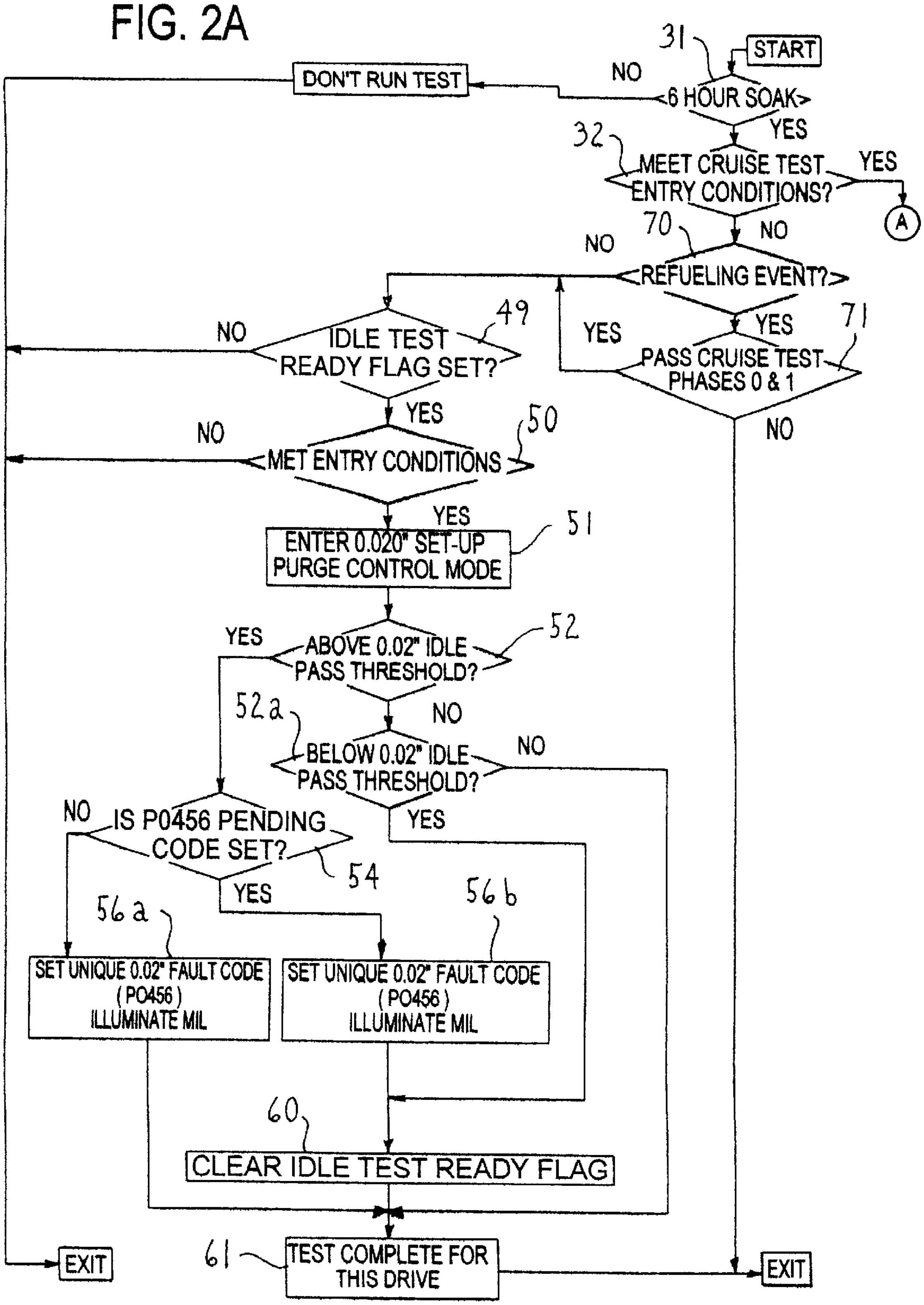
FIGS. 2A and 2B is a flow diagram illustrating the general sequence of steps involved in monitoring the evaporative purge system during both a vehicle cruise operating mode and a vehicle idle operating mode pursuant to an embodiment of the invention.
Figure 2B:
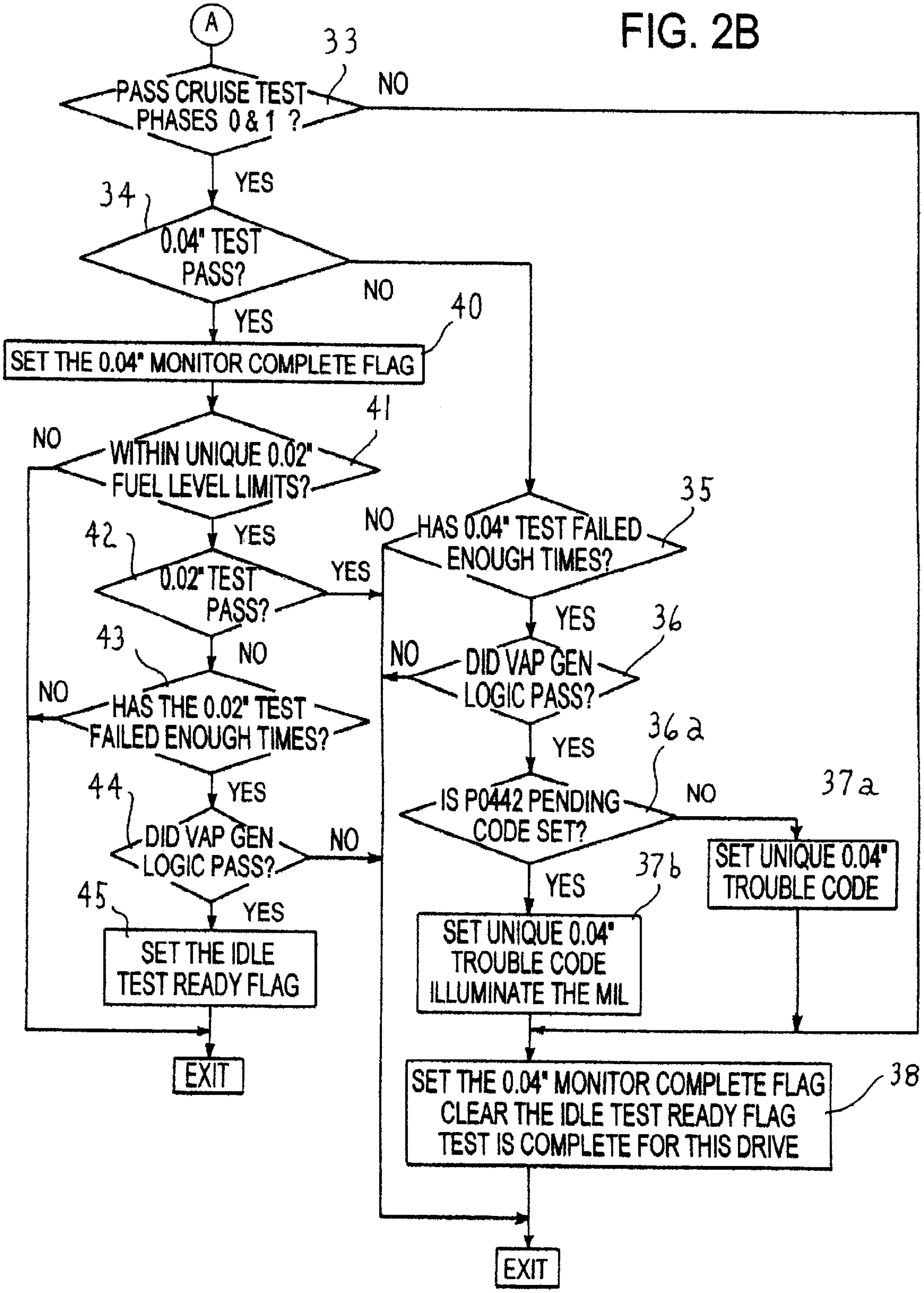
Figure 3A:
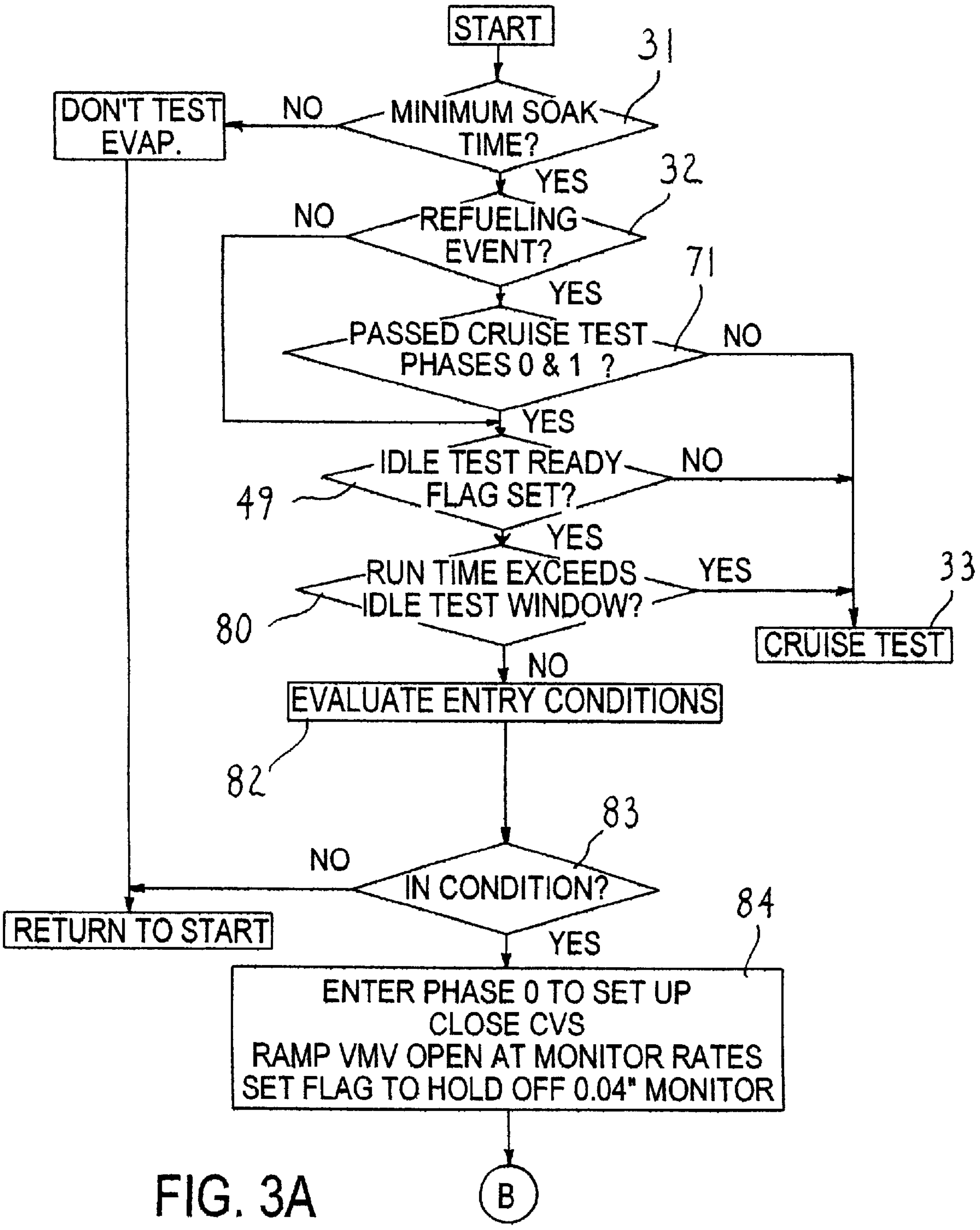
FIGS. 3A and 3B is a flow diagram illustrating the general sequence of steps involved to set up the evaporative purge system for an idle operating mode test while the vehicle is operated in the cruise operating mode pursuant to an embodiment of the invention.
Figure 3B:
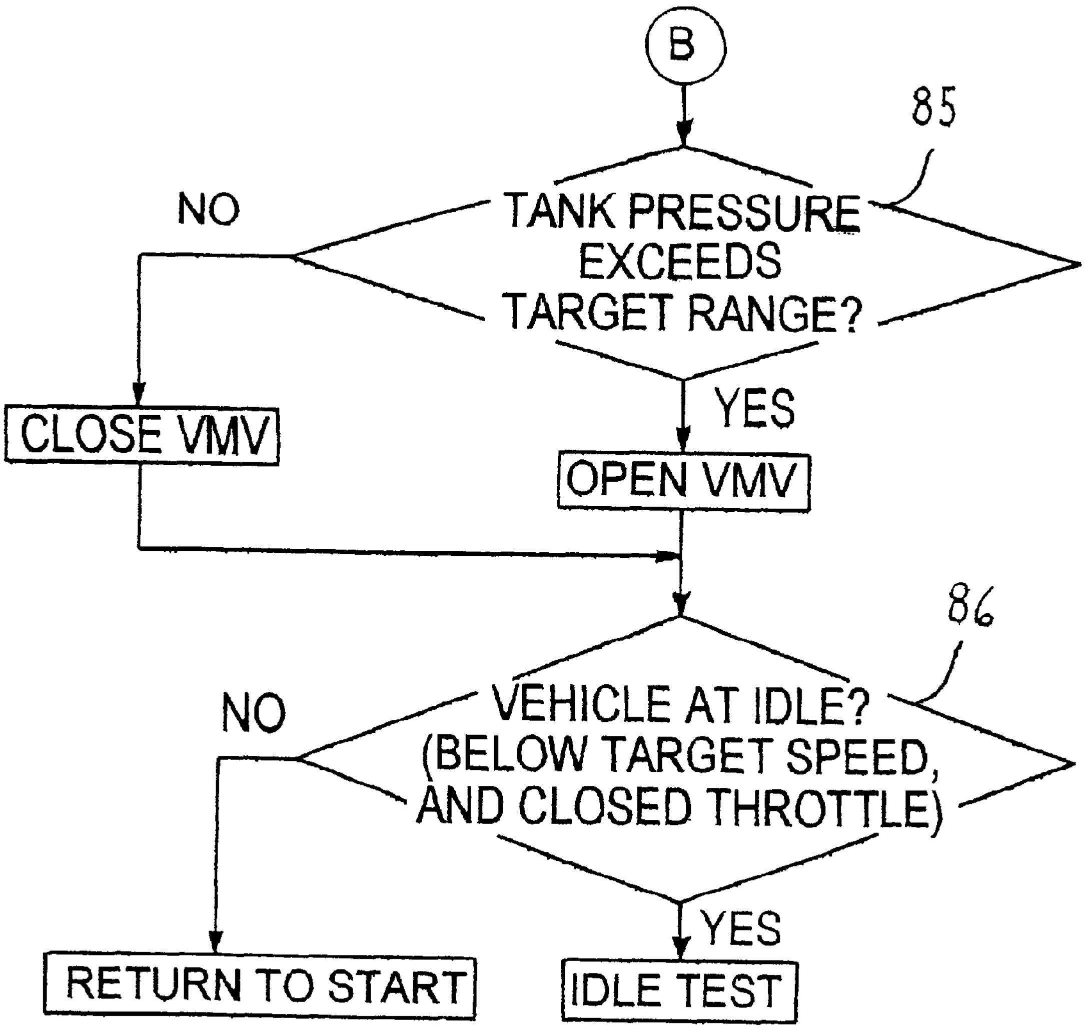

With reference to FIGS. 2 and 3, steps (monitoring logic sequence) of the inventive method and apparatus for monitoring the evaporative purge system pursuant to an embodiment of the invention are shown. To insure accurate readings, the monitoring system is designed to be operable only after a predetermined engine-off, or soak, period (e.g. minimum engine off time of 6 hours) as shown by conditional block 31 and after a plurality of entry conditions have been satisfied as shown by conditional block 32. If the soak condition is not met, the EEC 17 exits the monitoring routine to the "exit" block for that drive cycle. A drive cycle comprises an engine "on" and engine "off" cycle. From the "exit" block, the monitoring method returns to the "start" block such that the monitoring method will continually retry until conditions are satisfied or until the vehicle is shutdown.

If the soak condition is met, the EEC 17 proceeds to conditional block 32. At block 32, the cruise mode monitoring of the evaporative purge system 10 will begin if all of the following cruise test entry conditions have been met: 1) air temperature within 40 to 100 degrees F., 2) vehicle speed within 40 to 80 mph, 3) purge control valve 75% open, 4) fuel tank pressure within 3 inches of water to −17 inches of water, 5) engine load within 20% to 70% maximum, 6) closed loop fuel control, 7) fuel tank pressure fluctuations within a precalibrated empirically determined window, 8) engine load fluctuations within a precalibrated empirically determined window, 9) fuel level fluctuations within a precalibrated empirically determined window, 10) time since start of engine is greater than 5 minutes and less than 45 minutes, 11) cruise test has not been run on this drive cycle, 12) no circuit faults in the fuel tank pressure transducer, fuel level sender, purge control purge or canister vent solenoid, and 13) fuel level within 15% to 85% of usable fuel capacity.

If all the entry conditions are not met, the cruise test is not initiated and the monitoring sequence proceeds to block 70 described below.

If all the entry conditions are met, the cruise test (block 33) will be initiated. The cruise test comprises a pre-test Phase 0 and five test Phases 1 through 5 described in above U.S. Pat. No. 5,614,665. The pre-test Phase 0 and Phase 1 of the '665 patent are collectively represented by block 33 for convenience. The pre-test Phase 0 screens for a gross emission or malfunction in the system 10 and sets the purge vapor rates for determining an initial vacuum level (e.g. less than −7 inches of water) in the system 10, prior to a vacuum stabilization Phase 1, as explained in the '665 patent. If Phase 0 and 1 tests are passed, the method proceeds to conditional block 34. If Phase 0 and 1 tests are not passed, the method proceeds to conditional block 38 described below.

The conditional block 34 represents Phase 2 of the cruise test where a pressure change value is determined corresponding to the rise in the pressure in the fuel tank 12 after a predetermined amount of time. The measured pressure change value is compared in block 34 to a pressure change acceptance threshold corresponding to the presence of a 0.04 inch diameter emission. The pressure change acceptance threshold is empirically determined for each specific vehicle application.

If the conditional block 34 indicates that the measured pressure change value is less than the pressure change acceptance threshold, no system emission is detected. The monitoring sequence proceeds to the block 40 as described below.

If the pressure change is greater than the pressure change acceptance threshold in a first test, vapor emission from system 10 is indicated. If a retry counter has not expired, the test is performed as shown in conditional block 35 again to verify the emission. The pressure change test can be performed multiple times in block 35 (3 tests are typical) prior to proceeding to Phase 3. If any of the repeat tests do not indicate an emission in conditional block 35, a no emission condition is indicated, and the monitoring sequence proceeds to the "exit" block.

If the retry counter has expired and the pressure change acceptance threshold has been exceeded on each retry, the method proceeds to Phase 3 of the test where a vacuum stabilization phase represented by block 36 is conducted with the purge control valve 30 kept closed, and the CVS 26 opened to atmosphere to allow the fuel tank pressure to stabilize at atmospheric pressure for a predetermined time period or until the fuel tank pressure exceeds a predetermined target pressure threshold (e.g. 1 inch of water) as described in the '665 patent.

The monitoring method then proceeds to Phase 4 also represented by conditional block 36 for convenience where a vapor generation logic test (i.e. VAP GEN LOGIC) is performed to confirm the presence of the system emission already detected by Phase 2. At block 36, the purge control valve 30 and CVS 26 are closed to allow pressure to build in the system 10 over time (e.g. 70 seconds determined by a timer), and the pressure change is compared to a pressure threshold; e.g. 2 inches of water as described in the above '665 patent. The comparison is made continuously during the time period and rechecked when the timer has expired.

If the timer has expired (i.e. 70 seconds have elapsed) since initiation of the Phase 4 test, block 36, and the pressure change has exceeded the pressure threshold, the monitoring method concludes that conditions were not conducive to a reliable test (i.e. that fuel vapor generation was excessive). The monitoring sequence proceeds to the "exit" block.

On the other hand, if the pressure change does not exceed the pressure threshold, the system emission previously detected in Phase 2 is confirmed, and EEC 17 determines in conditional block **36*a* whether a pending malfunction code PO442 has been set in a previous test routine of system 10 indicating a confirmed 0.04 inch diameter emission in the system 10**.

If yes, the monitoring routine proceeds to the block **37*b* where a 0.04 inch trouble code PO442 is set indicating a 0.04 inch emission has been detected in the system 10** and, if desired, illuminating a warning light (illuminate the MIL) to alert the operator of the vehicle.

The monitoring method then proceeds to Phase 5 block 38 where EEC 17 clears the idle test ready flag described below from non-volatile memory and sets the 0.04 inch monitor complete test flag, indicating that the cruise test is complete for that drive cycle. The idle test ready flag is cleared from non-volatile memory so that the cruise test can be repeated on a subsequent drive cycle. The routine then proceeds to the "exit" block.

If the malfunction code PO442 has not been previously set, this indicates to the monitoring system that this is the first time the cruise test has been completed with the result confirming the large system emission (e.g. 0.04 inch diameter) in the system 10. The monitoring method proceeds to the block 37*a* where a 0.04 inch trouble code PO442 is set indicating a 0.04 inch emission has been detected in the system 10 and then proceeds to block 38 and then the "exit" block.

At Phase 5 block 38, the purge system 10 is returned to normal engine purge where the CVS 26 is opened at a calibrated rate to the full open position. The engine control system is allowed to return to either purge or adaptive learning, whichever the engine is requesting at the exit of the monitoring sequence. These steps are described in the above '665 patent.

Referring back to conditional block 34 of FIG. 2B, if the measured pressure change is less than the pressure change acceptance threshold in Phase 2, block 34, the system 10 is determined to be functioning properly without any emission greater than or equal to 0.04 inch diameter. The monitoring test proceeds to block 40 where a 0.04 inch monitor complete flag is set by EEC 17, indicating that the cruise test or screening for the relatively large vapor emission (i.e. 0.04 diameter) is complete.

The monitoring system proceeds to conditional block 41 where is determines whether the fuel level in the fuel tank 12 is within limits conducive to testing for a 0.020 inch emission (e.g. 45% to 85% of usable fuel capacity). If not, the sequence proceeds to the "exit" block.

If so, the sequence proceeds to blocks 42, 43, and 44 which represent continued cruise tests conducted in similar manner to the cruise tests associated with blocks 34, 35, and 36, but to screen or detect for a relatively smaller vapor emission in the evaporative purge system 10. For example, the cruise tests of blocks 42, 43, and 44 screen or test the system 10 for a small 0.02 diameter emission.

The conditional block 42 represents an extension of Phase 2 of the cruise test where a pressure change value is determined corresponding to the rise in the pressure in the fuel tank 12 after a predetermined amount of time exceeding that of block 34 above. The measured pressure change is compared in block 42 to a pressure change acceptance threshold corresponding to the presence of a 0.02 diameter emission. The pressure change acceptance threshold is empirically determined for each specific vehicle application.

If the conditional block 42 indicates that the measured pressure change is less than the pressure change threshold (e.g. 2 inches of water), no emission is detected, and monitoring proceeds to the "exit" block.

If the pressure change exceeds the pressure change acceptance threshold (e.g. 2 inches of water) in a first test, a small system emission is indicated. If a retry counter has not expired, the test is repeated as shown in block 43 again to verify the emission indication. The pressure change test can be performed multiple times (1 test is typical) prior to proceeding to Phase 3. If any of the repeat tests do not indicate an emission in conditional block 35 and 42, a no emission condition is declared, and monitoring proceeds to the "exit" block.

If the retry counter of block 43 has expired and the pressure change acceptance threshold has been exceeded on each retry, the method proceeds to block 44 which corresponds to the vapor generation block 36, where a vapor generation logic test is performed by closing purge control valve 30 and CVS 26 to allow pressure to build in the system 10 over time (e.g. 70 seconds) and the pressure build is compared to a pressure threshold; e.g. 2 inches of water. If the pressure build does not exceed the pressure threshold, then the monitor continues to compare the pressure build with the pressure threshold until the timer expires. When the timer expires, if the pressure did not exceed the pressure threshold, the emission previously detected in block 42 is confirmed. EEC 17 generates a command to set and store an idle test ready flag in non-volatile memory pursuant to the invention as shown by block 45 confirming a small vapor emission has been detected in the system 10. The monitor sequence proceeds to the "exit" block as this portion of the sequence has been completed for that drive cycle.

If the timer has expired (i.e. 70 seconds above) have elapsed since initiation of the Phase 4 test, block 44, and the pressure change has exceeded the pressure threshold, the monitoring method concludes that conditions were not conducive to a reliable test (i.e. that fuel vapor generation was excessive). The monitoring sequence proceeds to the "exit" block.

Monitoring of the evaporative purge system 10 as described above thus uses one or more (two described) screening tests in the cruise operating mode of the motor vehicle to screen for a large (0.04 diameter) and then a small (e.g. 0.02 diameter) system emission.

If a system emission is detected in the cruise operating mode, the command generated by EEC 17 (setting of the idle test ready flag ready in block 45) will direct subsequent monitoring of the evaporative purge system 10 when the motor vehicle assumes an idle operating mode represented by flow diagram blocks in FIG. 2A. In particular, the evaporative purge system 10 then is monitored by the EEC 17 using a relatively short time test in the idle operating mode of the motor vehicle to confirm whether the small (e.g. 0.02 diameter) system emission detected in the cruise operating mode above exists.

Referring to FIG. 2A, if an idle test ready flag set is present in block 45, the monitoring sequence exits the cruise portion of the test through the "exit" block and returns to the "start" block and proceeds to block 31 to determine if the soak condition described above is met. If not, the test of the system 10 is not run. If so, the monitoring method proceeds to the cruise test entry conditions block 32 described above to determine if they are met. If they are, the monitoring method proceeds to the cruise test block 33 described above.

If not, or if the cruise test has been completed as described in block 38 above, the monitoring method proceeds to conditional block 70 where it is determined whether a refueling event has occurred. A refueling event is determined by comparing the present fuel level to the lowest fuel level recorded during previous operation of the motor vehicle. If the present fuel level exceeds the lowest previous level by a predetermined threshold (e.g. 20% of indicated fuel capacity), a refueling event is detected. The refueling event indicates that the gas cap may possibly not be installed.

If no refueling event has occurred, then the monitoring method proceeds to the test in the idle operating mode beginning with the check of idle test ready flag in conditional block 49.

If a refueling event has occurred, then the monitoring method proceeds to conditional block 71, where it is determined whether Phase 0 and Phase 1 of the cruise test have been completed and passed. As mentioned above, the Phase 0 and Phase 1 cruise tests are described in detail in U.S. Pat. No. 5,614,665. If the Phase 0 and Phase 1 cruise tests have been passed, then the monitoring method proceeds to the conditional block 49 to determine if the idle test ready flag set is still present.

If the Phase 0 and Phase 1 cruise tests have not been passed, then the monitoring method exits the test through the "exit" block and returns to the "start" block. The monitoring method will continually retry until conditions of blocks 31 and 32 are satisfied and the 0.04 inch monitor complete flag is set or until the vehicle is shutdown.

The monitoring test of the system 10 in the idle operating mode is conducted if the idle test ready flag is set in block 45. If it is not present, the monitoring method proceeds to the "exit" block and then back to the "start" block as described above.

To insure accurate readings, the monitoring method is designed to be operable in the idle operating mode only after a plurality of entry conditions have been satisfied as shown by block 50. The method or routine of monitoring in the idle operating mode will begin if all of the following entry conditions have been met: 1) air temperature within an empirically determined range (e.g. 40 to 85 degrees F., 2) fuel level within an empirically determined range, 3) closed loop fuel control, 4) air-fuel ratio within a precalibrated empirically determined window, 5) vehicle speed below 10 mph, 6) closed throttle, 7) variations in fuel level within a precalibrated empirically determined range, 8) variations in engine load within a precalibrated empirically determined range, 9) variations in fuel tank pressure within a precalibrated empirically determined range, 10) engine run time in excess of 30 seconds and less than an empirically determined value, 11) no circuit faults in the fuel tank pressure transducer, fuel level sender, purge control valve, canister vent solenoid, or HEGO (heated exhaust gas oxygen) sensors associated with the exhaust catalyst, 12) engine load within an empirically determined range, and 13) fuel tank pressure within 3 inches of water to −17 inches of water.

If no idle test ready flag is present or if the entry conditions are not met, then the method proceeds to the "exit" block.

If the entry conditions are met in block 50, then new monitor specific purge flow ramp rates of the system 10 are provided at block 51 for determining an initial vacuum level in the system 10 during Phase 0, prior to a vacuum stabilization Phase 1, as explained for the cruise operating mode (block 33, 34) and also in U.S. Pat. No. 5,614,665. The monitor specific purge flow ramp rates are higher than those determined in Phase 0 of the cruise operating mode test to reduce the time to test in the idle operating mode.

The method proceeds to conditional block 52 where the pressure change is determined corresponding to the rise in the fuel tank pressure after a predetermined amount of time (e.g. 30 seconds). This test time is shorter in duration than the test time used in Phase 2 of block 42 in the cruise operating mode. The measured pressure change value is compared in block 52 to a pressure change acceptance threshold with a 0.02 inch diameter emission. The pressure change acceptance threshold is empirically determined for a specific vehicle.

If the conditional block 52 indicates that the measured pressure change is less than the pressure change acceptance threshold, no emission is detected, and monitoring proceeds to the block 52*a* where the measured pressure change value is compared to a pressure change acceptance threshold that is consistent with an emission-free system 10 (i.e. the measured pressure change is low enough to be consistent with an emission-free system). If yes, the system 10 is considered emission-free. If no, the monitoring method could not make an emission determination, and the system 10 is readied for another try when the conditions are correct. The pressure change acceptance threshold is empirically determined for a specific vehicle application.

If the measured pressure change in block 52*a* is less than the pressure change acceptance threshold, no vapor emission is present and the sequence proceeds to block 60 which clears the idle test ready flag, and proceeds to block 61, indicating completion of the idle test routine. The monitoring method then proceeds to the "exit" block, exiting the monitor mode and returning to the "start" block.

If the measured pressure change is greater than the pressure change acceptance threshold at block 52*a*, the monitoring sequence proceeds to block 61 described above. A measured pressure change greater than the pressure change acceptance threshold at block 52*a* indicates the test could neither confirm nor deny the presence of a 0.02 inch diameter emission.

If the system emission is confirmed at block 52, the EEC 17 checks to determine whether a malfunction pending code PO456 has been set in non-volatile memory in a previous test routine as shown by block 54.

If yes, the monitoring routine confirms the presence of the previously detected system emission, and the EEC 17 sets a 0.02 inch fault code PO456 in block 56*b* indicating the 0.02 inch emission is confirmed and may illuminate a warning light (illuminate MIL) to alert the operator of the vehicle to the fault.

The monitoring method then proceeds to the block 60, which indicates to EEC 17 to clear the idle test ready flag from non-volatile memory. The routine proceeds to block 61, which returns the purge system 10 to normal engine purge where the CVS 26 is opened at a calibrated rate ramp rate to the full open position. A flag is set indicating the completion of the idle test for this drive cycle. The engine control system is allowed to return to either purge or adaptive learning, whichever the engine is requesting at the present time. These steps are described in the above '665 patent.

If the malfunction code PO456 has not been previously set, this indicates to the monitoring system that this is the first time the idle test has been completed with the result confirming the small emission (e.g. 0.02 inch diameter) in the system 10. The EEC 17 sets a 0.02 inch fault code PO456 in block 56*a* indicating the 0.02 inch emission is confirmed and may illuminate a warning light (illuminate MIL) to alert the operator of the vehicle to the fault. The idle test ready flag is not cleared from non-volatile memory, so that the idle test can be repeated on subsequent drive cycles. The routine proceeds to block 61 described above.

The pressure change test in the idle operating mode as described above pursuant to the invention is advantageous in that it reduces many of the noise factors, such as changing altitude, vehicle acceleration, and lane changes, that may effect the test results conducted in the cruise operating mode of the motor vehicle and consumes less time to conduct.

Referring to FIG. 3, an embodiment of the invention is illustrated where the evaporative purge system 10 is prepared or set up for testing in the idle operating mode while the motor vehicle is operating in the cruise operating mode. This monitoring method reduces the time required for the subsequent test in the idle operating mode. In FIG. 3, the steps (blocks) of the monitoring method that are the same as those described above with respect to FIG. 2 bear like reference numerals.

In FIG. 3, while the motor vehicle is operating in the cruise mode, the monitoring method proceeds from the start block to conditional block 31. The system 10 is not tested if conditional block 31 indicates that the minimum soak time (e.g. minimum engine off time of 6 hours) is not met. If it is met, then the method proceeds to conditional block 32. If a refueling event has not occurred, then the monitoring method proceeds to the idle test flag ready set block 49.

If a refueling event has occurred, then the monitoring method proceeds to conditional block 71 where it is determined whether Phase 0 and Phase 1 of the cruise test have been passed. If the Phase 0 and Phase 1 cruise tests have not been passed, then the monitoring method proceeds to the cruise block 33 described above and then to the downstream monitoring steps represented by blocks 34, etc. of FIG. 2B.

If the Phase 0 and Phase 1 cruise tests have been passed, then the monitoring method proceeds to the conditional block 49 to determine if the idle test ready flag set is present.

If no idle test ready flag set is present at block 49, then the monitoring method proceeds to the cruise test block 33. If the idle test ready flag set is present at block 49, then the monitoring method proceeds to the conditional block 80 where it is determined if the vehicle run time exceeds a predetermined run time window (e.g. 30 seconds to 1200 seconds). If so, the monitoring method proceeds to cruise test block 33.

If the run time is less than the predetermined run time window, the monitoring method proceeds to block 82 where the following entry conditions are evaluated: 1) air temperature within an empirically determined range (e.g. 40 to 85 degrees F., 2) fuel level within an empirically determined range, 3) closed loop fuel control, 4) air-fuel ratio within an empirically determined range, 5) vehicle speed below 10 mph, 6) closed throttle, 7) variations in fuel level within a precalibrated empirically determined range, 8) variations in engine load within a precalibrated empirically determined range, 9) variations in fuel tank pressure within a precalibrated empirically determined range, 10) engine run time in excess of 30 seconds and less than an empirically determined value, 11) no circuit faults in the fuel tank pressure transducer, fuel level sender, purge control purge, canister vent solenoid, or HEGO (heated exhaust gas oxygen) sensors, 12) engine load within an empirically determined range, and 13) fuel tank pressure within 3 inches of water to −17 inches of water.

The monitoring method proceeds to conditional block 83 where it is determined whether or not all of the conditions are met. If not, the method exits to the "return to start" block of FIG. 3A.

If so, the monitoring method proceeds to block 84 that enters aforementioned Phase 0 to set-up the system 10 for testing in the idle operating mode. In particular, the CVS 26 is closed and the purge control valve (VMV) 30 is ramped opened at a predetermined rate to evacuate the system 10 to a predetermined pressure (e.g. −7 inches of water). During set-up of block 84, the system 10 is evacuated at monitoring specific rates in order to reduce the amount of time required to evacuate the system. A flag is set to disable the large (e.g. 0.04 inch diameter) emission monitor until either the idle test completes or the aforementioned conditions are met.

At conditional block 85, the monitoring method determines if system (tank) pressure is less than the predetermined vacuum (e.g. less than −7 inches of water). If system pressure is above the predetermined value, the purge control valve (VMV) 30 is opened to further evacuate the system 10. If system (tank) pressure is below the predetermined value, the purge control valve 30 is closed. Block 85 thereby determines if fuel tank pressure is within the target pressure window and stabilizes the tank pressure at the predetermined pressure level in a manner analogous to vacuum stabilization in Phase 1.

If fuel tank pressure is within the target pressure window at block 85, the monitoring method proceeds to block 86 where the EEC 17 determines if the vehicle is at idle (below a target speed and at closed throttle). If so, the monitoring method proceeds to the idle test block representing entry into block 52 of the sequence of steps of FIG. 2A.

If not, the monitoring method proceeds to the return to start block. The monitoring method will continually retry the steps of FIG. 3 until a maximum time since start of a drive cycle has elapsed (e.g. 1200 seconds) or until the vehicle is shutdown.

While the invention has been described in terms of specific embodiments thereof, it is not intended to be limited thereto but rather only as set forth in the appended claims.

I claim:

1. A method of monitoring an evaporative purge system of a motor vehicle for a vapor emission, comprising monitoring said evaporative purge system in a cruise operating mode of the motor vehicle to detect for a vapor emission in said system, providing a command to subsequently monitor said evaporative purge system in an idle operating mode of the motor vehicle if a vapor emission is detected in the cruise operating mode, and then if said command is provided, monitoring said evaporative purge system in the idle operating mode of the motor vehicle to confirm the vapor emission.

2. The method of claim 1 wherein said command is provided in a monitoring logic sequence during the cruise operating mode of the motor vehicle.

3. The method of claim 1 including generating a malfunction signal if monitoring in the idle operating mode confirms the vapor emission.

4. The method of claim 1 wherein said monitoring in the cruise mode is conducted by determining whether a measured pressure change that corresponds to a rise in pressure in the system over a predetermined amount of time when the system is sealed from atmosphere is less or greater than a pressure change threshold value.

5. The method of claim 4 wherein said monitoring in the idle operating mode is conducted by determining whether a measured pressure change that corresponds to a rise in pressure in the system over a predetermined amount of time when the system is sealed from atmosphere is less or greater than a pressure change threshold value.

6. The method of claim 5 wherein said monitoring in the cruise operating mode is conducted over a relatively longer predetermined amount of time compared to said predetermined amount of time that monitoring occurs in the idle operating mode.

7. The method of claim 1 including providing a predetermined vacuum level in said fuel tank before monitoring said evaporative purge system in the idle operating mode.

8. Apparatus for monitoring an evaporative purge system of a motor vehicle having a fuel tank, an evaporation canister communicated to the fuel tank, an internal combustion engine manifold communicated to said canister, a purge control valve for controlling flow of vapor from said canister to said intake manifold, and an electronic engine control for monitoring said evaporative purge system in a cruise operating mode of the motor vehicle to detect for a vapor emission from said system, for providing a command to monitor said evaporative purge system in an idle operating mode of the motor vehicle if vapor emission is detected in the cruise operating mode, and then if said command is provided, for monitoring said evaporative purge system in the idle operating mode of the motor vehicle to confirm the vapor emission.

9. The apparatus of claim 8 wherein said engine control provides said command in a monitoring logic sequence during the cruise operating mode of the motor vehicle.

10. The apparatus of claim 8 said engine control generates a malfunction signal if the emission is confirmed in the idle operating mode.

11. Apparatus for monitoring an evaporative purge system of a motor vehicle having a fuel tank, an evaporation canister communicated to the fuel tank having a valve to seal the system from atmosphere, an internal combustion engine manifold communicated to said canister, a purge control valve controllable to pull a vacuum on said canister and said fuel tank, a sensing device for sensing pressure in said fuel tank when the system is sealed, and an electronic engine control for monitoring said evaporative purge system in a cruise operating mode of the motor vehicle to detect for a vapor emission from said system by monitoring pressure in said fuel tank when the system is sealed from atmosphere, for providing a command to monitor said evaporative purge system in an idle operating mode of the motor vehicle if a vapor emission is detected in the cruise operating mode, and then if said command is provided, for monitoring said evaporative purge system in the idle operating mode of the motor vehicle by monitoring pressure in said fuel tank when said system is sealed from atmosphere to confirm the vapor emission, and generating a malfunction signal if the vapor emission is confirmed in the idle operating mode.

* * * * *